W. W. HUDSON.
GEARING.
APPLICATION FILED JAN. 17, 1918.

1,286,642.

Patented Dec. 3, 1918.

Inventor
W. W. Hudson

UNITED STATES PATENT OFFICE.

WILLIAM W. HUDSON, OF SALT LAKE CITY, UTAH, ASSIGNOR TO THE GENERAL ENGINEERING COMPANY, OF SALT LAKE CITY, UTAH, A CORPORATION OF UTAH.

GEARING.

1,286,642.  Specification of Letters Patent.  Patented Dec. 3, 1918.

Application filed January 17, 1918.  Serial No. 212,268.

*To all whom it may concern:*

Be it known that I, WILLIAM W. HUDSON, a citizen of the United States, and a resident of Salt Lake City, in the county of Salt Lake and State of Utah, have invented certain new and useful Improvements in Gearings, of which the following is a specification.

My invention is an improvement in gearing, and has for its object to provide mechanism of the character specified especially adapted for connecting a driving shaft with a gear ring of the character used in ball mill or rotary kilns, in ore grinding and cement work.

Figure 1:
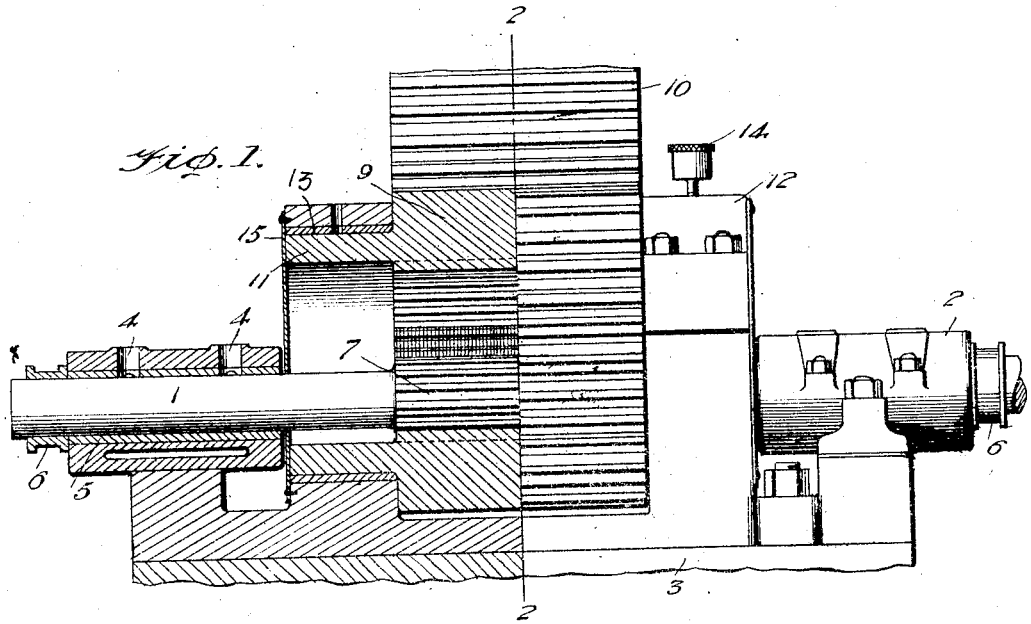
Figure 1 is a front view of the improved gearing, with parts in section.
Figure 2:
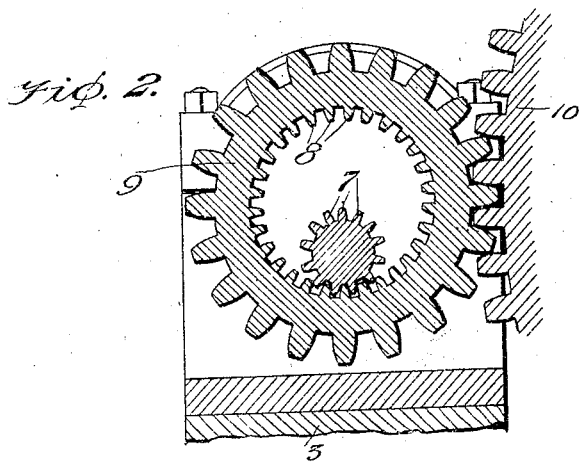
Fig. 2 is a section on the line 2—2 of Fig. 1.

In the present embodiment of the invention, a driving shaft 1 is journaled in fixed bearings 2 in a suitable support or base 3, and the said bearings 2 have lubricating means in the form of oil cups 4, which lead the oil to the shaft, a bushing 5 being arranged between the shaft and each bearing. Stop collars 6 are provided at the ends of the shaft, and the said shaft is adapted to be connected to a suitable motor by means of a flexible connection.

This shaft 1 is provided with an annular series of teeth forming a pinion 7 between the bearings, and the pinion meshes with a series 8 of internal gear teeth in a hollow pinion 9. This pinion 9 is a cylindrical body, and the teeth thereof mesh with the teeth of the gear ring 10 on the drum or kiln for rotating the same. The pinion 9 has cylindrical extensions 11 at its ends, which are co-axial with the pinion, and these extensions are received within sectional bearings 12 supported by the base and rigid therewith, the arrangement being such that the pinion 9 rotates on an axis eccentric to the shaft 1.

A bushing 13 is arranged between each bearing 12 and the adjacent extension 11, and oil cups 14 are provided for lubricating the bearing. The ends of the pinion 9 are closed by plates 15, which are secured to the ends of the bearings 12, as shown at the left of Fig. 1. The bearings 2 are also sectional, as shown, so that the parts may be easily assembled and disassembled.

In operation, when the shaft 1 is rotated, the pinion 9 will be rotated, because of the engagement of the teeth 7 with the internal teeth 8 of the pinion, and the pinion 9 will in turn rotate the gear ring 10 or other element to which it is connected.

I claim:

1. A gearing comprising a support, bearings at the ends of the support, a shaft journaled in the bearings and provided between the bearings with a rigid pinion, a ring shaped driving pinion through which the shaft passes and having internal gear teeth for meshing with the teeth of the pinion of the shaft, the support having bearing rings at the ends of the driving pinion, and the driving pinion having reduced cylindrical bearing extensions engaging the rings, and a means for lubricating each of the bearings.

2. A gearing comprising a hollow driving pinion having an internal gear, a shaft passing through the pinion and having a pinion engaging the teeth of the internal gear, fixed bearings in which the shaft is journaled, and fixed bearings for the pinion, said bearings for the pinion comprising rings, the driving pinion having cylindrical extensions co-axial with the pinion and extending into the rings.

3. A gearing comprising a ring having internal and external gear teeth, fixed bearings for the ring, and a shaft passing eccentrically through the ring and having a pinion engaging the teeth of the internal gear.

WILLIAM W. HUDSON.

Witness:

FRED B. VANATTA.